Patented Nov. 15, 1949

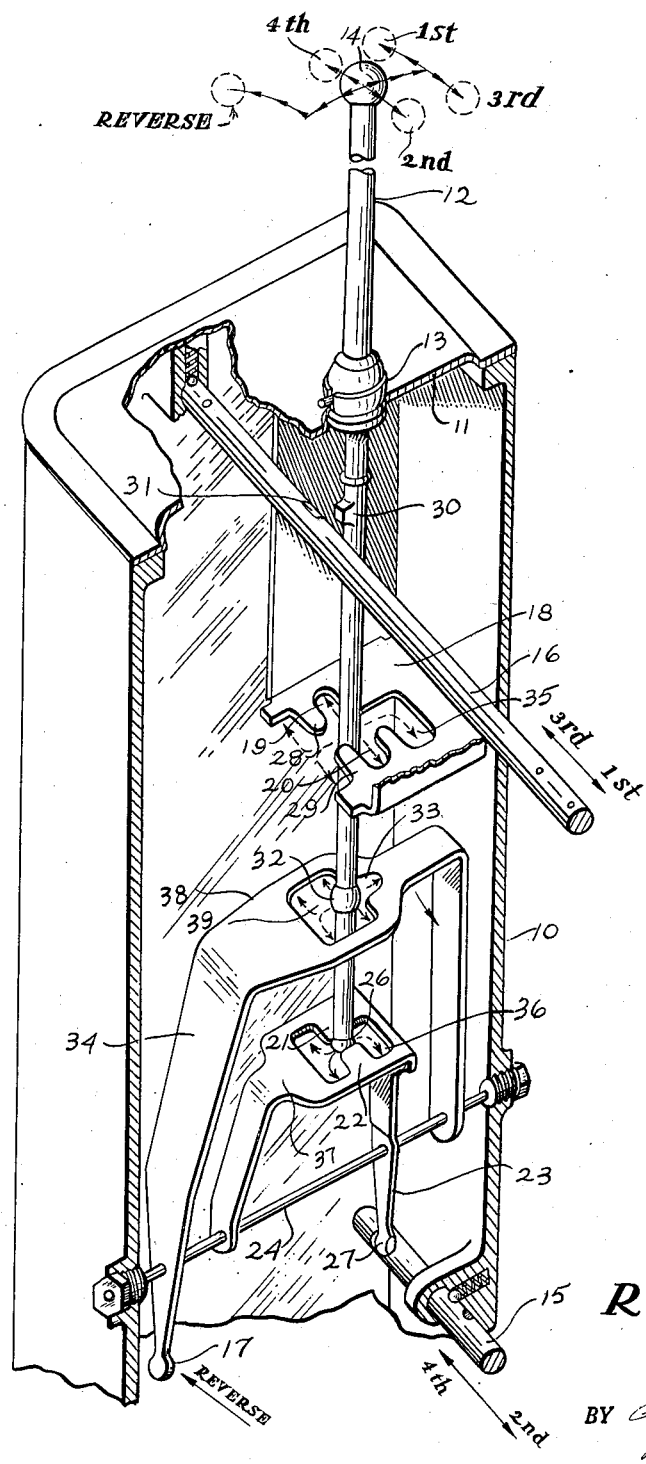

2,488,469

UNITED STATES PATENT OFFICE 2,488,469

TRACTOR TRANSMISSION CONTROL

Roy E. Farmer, Detroit, Mich., assignor to Ford Motor Company, Dearborn, Mich., a corporation of Delaware Application June 8, 1946, Serial No. 675,382

10 Claims. (Cl. 74—473)

1

This invention relates to a transmission control for automotive vehicles and more particularly to a multispeed gearshift control adapted for transmissions having at least four forward speeds.

The principal object of this invention is to devise a gearshift control adaptable for use on agricultural tractors and the like and which is capable of withstanding the rigorous service required in such vehicles. Since most agricultural tractors are built around a tubular member which serves both as the frame and as the enclosure for the transmission, propeller shaft, differential and axle, the gearshift constructions which are adapted to passenger vehicles and trucks having a conventional frame and chassis are not entirely suitable. Still another object is to obtain at least four forward speeds since the conventional three forward speeds given by passenger automobile transmissions are insufficient to yield maximum performance in a tractor. Because of the space restrictions imposed by the relatively narrow tubular frame, the width of the control mechanism, including the scope of its necessary movement, must be held to a minimum throughout. In addition to the width restriction, the design of tractor transmission controls is further complicated by even more rigid longitudinal dimension limitations. These restrictions stem from the relatively short wheel base common to tractors, combined with the space requirements inherent in the necessarily rugged differential.

The construction described herein is particularly advantageous for incorporation into the tubular frame of a tractor since it is capable of assembly and operation within the narrow transverse and longitudinal limits of such a frame. A further advantage of this structure is its simplicity and economy of construction. A further advantage is that the required number of speeds can be provided without a complicated shifting mechanism.

With these and other objects in view, the invention consists in the arrangement, construction and combination of the various parts of the improved device, as described in the specification, claimed in the claims and illustrated in the accompanying drawings which show an elevation, partially in section, of the improved transmission control.

The transmission is assembled in frame 10 which is closed by cover 11. Shift lever 12 is supported by cover 11 in ball joint 13 and carries at its upper end shift knob 14. Shift lever 12 is shown in solid lines in the neutral position. Moving the shift lever directly forward engages fourth

2 gear. Moving the shift lever directly to the rear engages second gear. A movement of gear lever 12 to the right and then forward engages first gear, and to the right and then to the rear engages third gear. To go into reverse gear, shift lever 12 is moved first to the left and then forward.

The fork (not shown) controlling second and fourth gear is operated by rail 15. The fork (not shown) controlling third and first gear is operated by rail 16. Similarly, reverse gear is obtained by movement of a rail (not shown) by knob 17. To assure definite and positive engagement of shift lever 12 with the various cooperating linkages, use is made of guide plate 18. When shift lever 12 is moved directly forward from the neutral position to obtain fourth gear, the lower part of this shift lever moves into recess 20 in guide plate 18. Conversely when shift lever 12 is moved directly to the rear from the neutral position to engage second gear, the lower part of the shift lever is guided by recess 19 in guide plate 18. Projections 21 and 22 are directly below recesses 19 and 21 respectively and are a part of lower finger plate 37 which is formed as an extension of lever 23. Lever 23 is pivoted on rod 24. A forward movement of shift lever 12 causes a backward movement of knob 26 against projection 22 in lower finger plate 37 and a corresponding forward movement of ball 27. This moves rail 15 forward and engages fourth gear. A rearward movement of shift lever 12 causes a forward movement of knob 26 against projection 21 in lower finger plate 37 and a corresponding backward movement of ball 27. This moves rail 15 to the rear and engages second gear.

To engage first or third gear, shift lever 12 is first moved to the right. This causes the lower portion of the shift lever 12 to move to the left of projections 28 and 29 in guide plate 18. The movement of knob 14 to the right causes projection 30 to engage recess 31 in rail 16. A subsequent forward or backward movement of knob 14 will impart to rail 16 a backward or forward motion and engage first or third gear respectively. Knob 26 follows the course indicated by the left hand arrows in lower finger plate 37 during a shift into first or third gears.

To engage reverse gear, knob 14 is first moved to the left and then forward. The movement of knob 14 to the left causes rounded enlargement 32 to move into recess 33 in upper finger plate 38. Upper finger plate 38 is an extension of lever 34 which revolves about rod 24 and hence is concentric with lever 23. Upper finger plate 38 is provided with small recess 33 opening into a larger recess 39. Larger recess 39 is designed to clear the necessary movements of rounded enlargement 32 during shifting into the four forward gears. However, when a movement to the left of knob 14 has caused rounded enlargement 32 to enter recess 33, a subsequent forward movement of knob 14 is reflected in a backward movement of rounded enlargement 32 and finger plate 38 as indicated by the solid arrow. This causes a forward movement of knob 17 which in turn moves a rail (not shown) which actually engages the reverse gears. Shift lever 12 follows the dotted arrow into recess 35 in guide plate 18 during the shift into reverse. Knob 26 follows the course indicated by the dotted arrow into recess 36 in lower finger plate 37 to permit reverse gear to be engaged.

Levers 23 and 34 supporting lower finger plate 37 and upper finger plate 38 respectively have been shown as U-shaped and pivoted on each side on rod 24. This construction has been adopted because these levers can be made simply and economically by stamping from sheet metal. However, this type of structure is not mandatory. The finger plates could, if desired, be supported by L-shaped levers supported only on the side of frame 10 adjacent the rail to be operated. Lever 34 has been shown mounted above lever 23. If desired this order can be reversed without departing from the spirit of the invention.

By the above described structure there is provided a simple rugged gear selector mechanism especially suitable for tractor service. This device is capable of giving the necessary number of gear changes required for tractor service and of fitting into the rigid space requirements of the tubular frame common to agricultural tractors.

The invention claimed is:

1. In a transmission control apparatus, a substantially vertical shift lever, a guide plate, a pivoted upper finger plate, and a lower finger plate pivoted concentrically with the upper finger plate, said guide plate having interconnected recesses to definitely position said shift lever in five working positions and a neutral position, said upper finger plate having a connecting large and small recess, said large recess clearing the shift lever in the neutral position and four of the five working positions and said small recess designed to operatively receive the shift lever in the fifth operative position.

2. In a transmission control apparatus, a substantially vertical shift lever, a guide plate, a pivoted upper finger plate, and a lower finger plate pivoted concentrically with the upper finger plate, said guide plate having interconnected recesses to definitely position said shift lever in five working positions and a neutral position, and said lower finger plate having two projections longitudinally aligned with the shift lever in the neutral position.

3. In a transmission control apparatus, a substantially vertical shift lever, a guide plate, a pivoted upper finger plate, and a lower finger plate pivoted concentrically with the upper finger plate, said guide plate having interconnected recesses to definitely position said shift lever in five working positions and a neutral position, and said lower finger plate having two spaced longitudinal projections aligned with the shift lever in the neutral position and two longitudinal recesses connected by the space between said projections.

4. In a transmission control apparatus, a substantially vertical shift lever, a guide plate substantially normal to the shift lever, a pivoted upper finger plate, and a lower finger plate pivoted concentrically with the upper finger plate, said guide plate having a longitudinal slot with an axis intersecting the axis of the shift lever in the neutral position, a transverse slot having an axis also intersecting the axis of the shift lever in the neutral position, said transverse slot terminating at one end in a longitudinal recess having an axis parallel to the axis of the longitudinal slot and located entirely on one side of the axis of the transverse slot and terminating at the other end in a longitudinal recess having an axis parallel to the axis of the longitudinal slot and located on both sides of the axis of the transverse slot, all of said slots and recesses being interconnected and wider than the diameter of the shift lever, said lower finger plate having recesses which will clear the shift lever in all positions in said guide plate except those positions defined by the first-mentioned longitudinal slot.

5. In a transmission control apparatus, a substantially vertical shift lever, a guide plate substantially normal to the shift lever, a pivoted upper finger plate, and a lower finger plate pivoted concentrically with the upper finger plate, said guide plate having a longitudinal slot with an axis intersecting the axis of the shift lever in the neutral position, a transverse slot having an axis also intersecting the axis of the shift lever in the neutral position, said transverse slot terminating at one end in a longitudinal recess having an axis parallel to the axis of the longitudinal slot and located entirely on one side of the axis of the transverse slot and terminating at the other end in a longitudinal recess having an axis parallel to the axis of the longitudinal slot and located on both sides of the axis of the transverse slot, all of said slots and recesses being interconnected and wider than the diameter of the shift lever, and said upper finger plate having a large recess which will clear the shift lever in all positions in said guide plate except that position defined by the longitudinal slot in the guide plate located entirely on one side of the transverse slot.

6. In a transmission control apparatus, a substantially vertical shift lever, a guide plate substantially normal to the shift lever, a pivoted upper finger plate, and a lower finger plate pivoted concentrically with the upper finger plate, said guide plate having a longitudinal slot with an axis intersecting the axis of the shift lever in the neutral position, a transverse slot having an axis also intersecting the axis of the shift lever in the neutral position, said transverse slot terminating at one end in a longitudinal recess having an axis parallel to the axis of the longitudinal slot and located entirely on one side of the axis of the transverse slot and terminating at the other end in a longitudinal recess having an axis parallel to the axis of the longitudinal slot and located on both sides of the axis of the transverse slot, all of said slots and recesses being interconnected and wider than the diameter of the shift lever, said upper finger plate having a large recess which will clear the shift lever in all positions in said guide plate except that position defined by the longitudinal slot in the guide plate located entirely on one side of the transverse slot and said lower finger plate having recesses which will clear the shift lever in all positions in said guide plate except those positions defined by the first-mentioned longitudinal slot.

7. In a transmission control apparatus, a substantially vertical shift lever, a shift rail adjacent to but laterally displaced from the vertical shift lever, a pivoted upper finger plate, a pivoted lower finger plate, a guide plate having a longitudinal slot with an axis intersecting the axis of the shift rod in the neutral position and having a transverse slot with an axis also intersecting the axis of the shift lever in the neutral position, said transverse slot terminating at one end in a longitudinal recess having an axis parallel to the axis of the longitudinal slot and located entirely on one side of the axis of the transverse slot and terminating at the other end in a longitudinal recess having an axis parallel to the axis of the longitudinal slot and located on both sides of the axis of the transverse slot, all of said slots and recesses being interconnected and wider than the diameter of the shift lever, said lower finger plate having recesses which will clear the shift lever in all positions in said guide plate except those defined by the first-mentioned longitudinal slots, and said shift rail and shift lever being provided with connecting means to engage the shift lever and rail upon a lateral movement of the shift lever.

8. In a transmission control apparatus, a substantially vertical shift lever, a shift rail adjacent to but laterally displaced from the vertical shift lever, a pivoted upper finger plate, a pivoted lower finger plate, a guide plate having a longitudinal slot with an axis intersecting the axis of the shift lever in the neutral position and having a transverse slot with an axis also intersecting the axis of the shift lever in the neutral position, said transverse slot terminating at one end in a longitudinal recess having an axis parallel to the axis of the longitudinal slot and located entirely on one side of the axis of the transverse slot and terminating at the other end in a longitudinal recess having an axis parallel to the axis of the longitudinal slot and located on both sides of the axis of the transverse slot, all of said slots and recesses being interconnected and wider than the diameter of the shift lever, said upper finger plate having a large recess which will clear the shift lever in all positions in said guide plate except that position defined by the longitudinal slot in the guide plate located entirely on one side of the transverse slot, said shift rail and shift lever being provided with connecting means to engage the shift lever and rail upon a lateral movement of the shift lever.

9. In a transmission control apparatus, a substantially vertical shift lever, a shift rail adjacent to but laterally displaced from the vertical shift lever, a pivoted upper finger plate, a pivoted lower finger plate, a guide plate having a longitudinal slot with an axis intersecting the axis of the shift lever in the neutral position and having a transverse slot with an axis also intersecting the axis of the shift lever in the neutral position, said transverse slot terminating at one end in a longitudinal recess having an axis parallel to the axis of the longitudinal slot and located entirely on one side of the axis of the transverse slot and terminating at the other end in a longitudinal recess having an axis parallel to the axis of the longitudinal slot and located on both sides of the axis of the transverse slot, all of said slots and recesses being interconnected and wider than the diameter of the shift lever, said upper finger plate having a large recess which will clear the shift lever in all positions in said guide plate except that position defined by the longitudinal slot in the guide plate located entirely on one side of the transverse slot, said shift rail and shift lever being provided with connecting means to engage the shift lever and rail upon a lateral movement of the shift lever said lower finger plate having recesses which will clear the shift lever in all positions in said guide plate except those positions defined by the first-mentioned longitudinal slot.

10. A tractor transmission control comprising three shift rails, one shift rail being operated by direct engagement with a shift lever and each of the other rails being operated by one of a pair of concentrically mounted levers said shift lever passing through an opening in each of said concentrically mounted levers.

ROY E. FARMER.

REFERENCES CITED

The following references are of record in the file of this patent:

UNITED STATES PATENTS

| Number | Name | Date |
|---|---|---|
| 1,185,350 | Seaman | May 30, 1916 |
| 1,446,824 | Brown | Feb. 27, 1923 |
| 1,787,766 | Smith | Jan. 6, 1931 |
| 1,820,006 | Beringer | Aug. 25, 1931 |
| 1,963,387 | Simpson | June 19, 1934 |
| 2,097,566 | Hummer | Nov. 2, 1937 |
| 2,197,938 | Lapsley et al. | Apr. 23, 1940 |